July 30, 1946.    W. C. BUCKNAM    2,405,010
VALVE
Original Filed Jan. 13, 1938
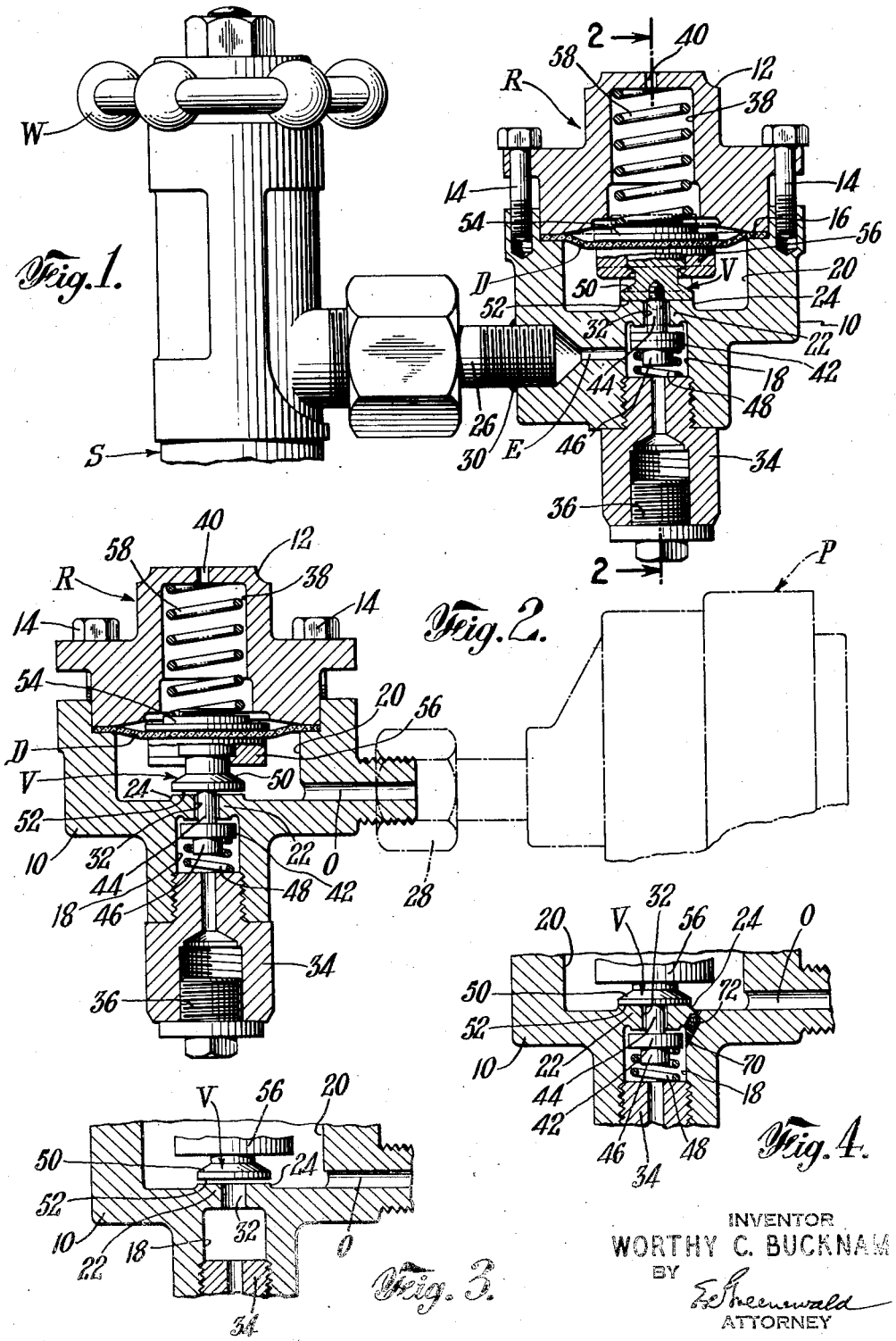
INVENTOR
WORTHY C. BUCKNAM
BY
ATTORNEY Patented July 30, 1946

2,405,010

UNITED STATES PATENT OFFICE 2,405,010

VALVE

Worthy C. Bucknam, Mechanic Falls, Maine, assignor, by mesne assignments, to Union Carbide and Carbon Corporation, a corporation of New York Original application January 13, 1938, Serial No. 184,791, now Patent No. 2,308,643, January 19, 1943. Divided and this application June 4, 1942, Serial No. 445,697

8 Claims. (Cl. 137—78)

This invention relates to valve assemblies, and more particularly to an improved reducing valve assembly adapted to be interposed between a pressure regulator and a source of fluid under high pressure to throttle the initial high pressure of fluid issuing from said source. The present application is a division of my copending application Serial No. 184.791, filed January 13, 1938, now Patent No. 2,308,643, issued January 19, 1943.

Commercial gases are usually stored in cylinders or other suitable containers under relatively high pressure. When these gases are to be used with various pieces of apparatus, such as oxyacetylene blowpipes, for example, the desired operating pressure of the gas in the apparatus is maintained by a pressure regulator connected in the line between the gas supply and the apparatus. These pressure regulators are usually diaphragm operated, built to withstand a certain pressure, and permit the gas to pass through the regulator to the apparatus at a predetermined pressure. If the valve on the gas cylinder or other container is initially opened too quickly due to carelessness, inadvertence, or mistake, gas issues therefrom with rapidly increasing pressure. The sudden rush of high pressure gas to the regulator and the resultant high temperature due to the heat of compression within the regulator may cause rupture of the regulator diaphragm and damage to other parts of the regulator. For these reasons, it is desirable to provide some means between the regulator and the gas supply to at least partially throttle this initial rush of gas so that pressure within the regulator will build up more slowly to the desired operating value.

It is therefore an object of this invention to provide mechanism adapted to establish communication between a source of supply of fluid under relatively high pressure and a regulator, which mechanism includes means operable to restrict the initial flow of fluid from said source of supply for a sufficient period to permit the pressure at the inlet of such regulator to increase gradually to the full pressure of the fluid in said source of supply. Another object is to provide a valve assembly which may function as a single stage regulator or as the first stage of a two-stage regulator; and which is simple in construction, economical to manufacture and readily adaptable to use with various forms of gas containers, regulators and other apparatus.

These and other objects of the invention will in part be obvious and in part be apparent from the following description and the accompanying drawing, in which:

Fig. 1 is a transverse section through one form of valve assembly embodying the invention, showing the valve assembly attached to a gas cylinder;

Fig. 2 is a section on the line 2—2 of Fig. 1; and

Figs. 3 and 4 are partial sections illustrating modifications of the valve assembly illustrated in Figs. 1 and 2.

Generally speaking, the invention comprises, in the combination of a cylinder or tank adapted to contain a fluid under relatively high pressure and having an outlet controlled by a valve and a pressure regulator having an inlet, mechanism adapted to establish communication between the outlet of the cylinder or tank and the inlet of the regulator. The mechanism includes means operable, upon every initial opening of the cylinder outlet control valve, to restrict the initial flow of fluid from the cylinder or tank to the regulator for a sufficient period of time to permit the fluid pressure at the regulator inlet to build up or increase gradually to either a preselected pressure or to the full pressure of the fluid in the cylinder or tank, and means operable, after the regulator inlet pressure attains such preselected or full value, to permit flow of fluid from the cylinder or tank outlet to the regulator inlet which is relatively unrestricted compared to the flow when the bleeder functions and the valve face 52 engages its seat boss 24.

One form of apparatus embodying the principles of the invention is shown in the drawing, and comprises a high pressure valve assembly R interposed between the outlet of a gas cylinder or container S and the inlet of a pressure regulator P. The outlet valve of the gas cylinder or container S may be controlled by suitable operating means such as a valve wheel W.

The valve assembly R includes a body or housing 10 and a cap 12 which is secured to the body by suitable means such as bolts 14. A pressure responsive means, such as a diaphragm D, is clamped between the lower face of the cap 12 and a shoulder 16 formed in the upper face of the body 10, which body is divided into a lower chamber 18 and an upper chamber 20 separated by a partition 22 forming one wall of each chamber and including a boss 24 constituting a substantially plane valve seating surface. An inlet passage E extends from the outside of the body 10 to the chamber 18 and in the outer end of this inlet passage is secured a nipple 26 connected to the outlet of the cylinder S. Chamber 20 communicates with the inlet of regulator P through an outlet passage O to which is secured a second nipple 28 connected to the inlet of pressure regulator P. The nipple 26 may be sealed to the valve assembly R by suitable means such as solder 30. Chamber 18 may communicate with chamber 20 through an opening 32 formed centrally in the partition 22.

The lower wall of chamber 18 comprises a nipple 34 closed by a threaded plug 36. For a purpose to be described hereinafter, the cap 12 is formed with a recess 38 open to the atmosphere as at 40.

In the embodiment of the invention shown in Figs. 1 and 2, a double valve V, mounted in the valve assembly R, controls the flow of fluid through the opening 32. The lower head 42 of this double valve is formed to have a gas-tight seating engagement with the lower side of the partition 22 and is secured to the lower end of a stem 44 extending through opening 32. A spring seating stud seating stud 46 extends downwardly from the head 42 and is surrounded by a spring 48 which engages the head 42 and the upper end of the nipple 34 to normally urge the valve V to an upper position. At its upper end, stem 44 is threaded into a stud 50 having a relatively wide, substantially plane lower face 52 adapted to engage the boss 24 on the partition 22. The boss 24 is so formed that, when the face 52 of the stud 50 is in engagement therewith, gas may leak, bleed or permeate between this face and the boss. The lower face 52 of the stud 50, in cooperation with the boss 24, thus forms a permeable closure for the opening 32. Stud 50 extends through the diaphragm D, to which it is secured by a nut 54 engaging the upper side of the diaphragm and forcing the latter against a block 56 interlocked with the stud 50 beneath the diaphragm D. A spring 58, seated in the recess 38, engages the top of this recess and the nut 54 to normally urge valve V to its lower position.

In this embodiment of the invention, when the valve of the gas cylinder or container S is fully closed, the double valve V occupies the position shown in solid lines in Fig. 1 directly in response to an outlet pressure which is below a substantially predetermined amount and allows spring 58 to seat the valve. If the valve wheel W is turned in a direction to open the cylinder or container valve, gas will pass from cylinder S through the nipple 26 and inlet E into the chamber 18. This gas will leak at a reduced rate of flow between the boss 24 and the face 52 of the stud 50 into the chamber and thence through outlet O and nipple 28 to regulator P. The pressure in chamber 20 and regulator P will gradually increase, and, when it has reached a substantially predetermined value, the diaphragm D will be moved upwardly a short distance, directly in response to said substantially predetermined outlet pressure, compressing the spring 58 and thereby moving the face 52 of the stud 50 away from the boss 24. The reason the valve is moved in response to a substantially predetermined pressure in the outlet passage is that the area of the valve exposed to inlet pressure is but a small minor part of the area of the valve and diaphragm exposed to outlet pressure as shown by all the figures of the drawing, whereby the valve actuation is substantially independent of inlet pressure so that a substantially predetermined outlet pressure is believed to effect valve operation as desired. Gas will then flow relatively freely from the chamber 18 to the chamber 20 through opening 32 compared to the flow through the bleeder alone. The valve now occupies the position shown in full lines in Fig. 2, and is acting as a single-stage regulator or as a first-stage of a two-stage regulator.

If the pressure in the chamber 20 becomes excessive for any reason, the diaphragm D will be moved upwardly a greater distance, bringing the gas-tight lower head or second valve 42 into engagement with the lower side of the partition 22, and completely interrupting the flow of gas from the cylinder S to the pressure regulator P, directly in response to said excessive pressure in the outlet which is higher than was needed to unseat the upper head or stud 50 of valve V.

The diaphragm D and the springs 48 and 58 are so proportioned that the valve head 42 of the valve V will act as the first-stage of a pressure regulator after the pressure in chamber 20 has increased sufficiently to lift the valve head 42 into flow controlling relation with the lower side of the partition 22. For instance, if the desired operating pressure is 125 pounds per square inch, the valve head 42 will engage the partition 22 when the pressure in chamber 20 exceeds this amount. At or below this operating pressure, the double valve V will, in comparison to the flow when face 52 engages boss 24, permit relatively unrestricted flow of fluid through opening 32 until the pressure in the cylinder S (and consequently in chamber 20) has dropped to approximately 50 pounds per square inch. When the pressure drops to or below this amount, stud 50 will again engage boss 24 to substantially interrupt the flow of fluid through opening 32 until a new cylinder or container has been connected to valve assembly R. By varying the relative strength of the upper and lower springs, any desired operating conditions may be attained.

The valve V has been illustrated in Figs. 1 and 2 as a double valve for the purpose of illustrating the action of the improved valve assembly R as a first-stage regulator or as part of a two-stage regulator. However, the construction may be considerably simplified, as shown in Fig. 3, by removing the lower half of the valve V so that only the upper stud 50 remains. When so modified, valve V will act in the same manner as previously described to throttle the initial pressure of the fluid issuing from the cylinder or container S until sufficient pressure has been built up in the chamber 20 to lift the diaphragm D and permit unrestricted flow of fluid between chamber 18 and chamber 20.

Furthermore, instead of so forming the boss that gas will leak between the boss and the face 52 of the stud 50 when these elements are in engagement, the engagement between these two parts may be made gas-tight and the construction shown in Fig. 4 utilized. In Fig. 4, an offset opening 70 is provided in the partition 22 and extending between the chambers 18 and 20, and secured in this offset opening is means, such as an adjustable bleeder valve 72, permitting limited communication between the chambers 18 and 20 at all times. With the construction shown in Fig. 4, the adjustable bleeder valve permits limited communication and a reduced flow of fluid between the chambers 18 and 20 when the valve V is in such a position that the face 52 of the stud 50 is in engagement with the boss 24. The operation of this embodiment of the invention is otherwise the same as that described for the embodiment illustrated in Figs. 1 and 2.

While specific embodiments of the novel features of the invention have been shown, the invention may be otherwise embodied and the relative dimension and interrelation of parts changed, provided the objects of the invention are attained.

What is claimed is:

1. The method of protecting a pressure damageable element against injury from a surge from a source of gas at high pressure which comprises restricting the initial gas flow between the source and element to a small amount directly in response to a gas pressure on the element which is below a substantially predetermined value and which is substantially independent of the gas pressure at the source so as to gradually build up gas pressure on the element, and then greatly increasing said gas flow by freeing the flow from such restriction directly in response to the attainment of said substantially predetermined value of gas pressure on the element substantially independently of the gas pressure at the source.

2. The method of protecting a pressure damageable element against injury from a surge from a source of gas at high pressure which comprises restricting the initial gas flow between the source and element to a small amount directly in response substantially solely to a gas pressure on the element which is below a substantially predetermined amount so as to gradually build up gas pressure on the element, increasing the flow by removal of such restriction directly in response to the attainment of said substantially predetermined amount of gas pressure on the element substantially independently of the gas pressure at the source, and subsequently cutting off the flow of gas directly in response to a substantially predetermined gas pressure on said element which is higher than that for increasing the gas flow from its initial restricted rate.

3. The method of protecting a pressure regulator diaphragm against the impact of high fluid pressure in event a valve at a source of high fluid pressure should be opened too quickly which comprises effecting a slow build up of fluid pressure at the regulator from said source directly in response to the existence of a fluid pressure below a substantially predetermined level at the regulator until the fluid pressure at such regulator has risen in value to said substantially predetermined level and then increasing the flow of fluid to the regulator by removal of such restriction.

4. The combination with a valve housing, of a valve therein, a fluid inlet passage and a fluid outlet passage in the housing, a seat for the valve between said passage, bleeder means between the inlet and outlet passages for passing fluid at a greatly restricted rate when the valve is seated, and a spring biased fluid pressure responsive device for effecting engagement and disengagement of the valve with its seat, said device seating said valve directly in response to a fluid pressure below a substantially predetermined amount in the outlet passage and unseating the valve directly in response to said substantially predetermined amount of fluid pressure in the outlet passage, said device moving said valve against the fluid pressure in the inlet passage to seat the same and the area of the valve exposed to inlet fluid pressure when seated being small and the force of inlet fluid pressure on the valve when seated being but a small minor part of the total force on the valve and device responsive to outlet fluid pressure for seating and unseating the valve whereby the outlet fluid pressures for actuating the valve are substantially independent of the fluid pressure in the inlet passage.

5. An automatic safety device to preclude a sudden rush of fluid pressure to an outlet passage from a source of fluid under high pressure, which comprises a fluid outlet passage, an inlet passage for connection to a source of fluid under high pressure, a valve between said passages, a housing for the valve, a spring cooperating with said valve and housing and biasing said valve to a closed position, restricted bleeder means for passing fluid very slowly between said passages while the valve is in its closed position to build up fluid pressure slowly in the first mentioned passage, a fluid pressure device responsive directly to outlet pressure of a substantially predetermined value for moving said valve to an open position after fluid pressure has been allowed to build up to said substantially predetermined amount in said first mentioned passage.

6. An automatic safety device to preclude a sudden rush of fluid under pressure to a passage from a source of fluid under high pressure, which comprises an outlet passage adapted for connection to a fluid pressure regulator, an inlet passage adapted for connection to a source of fluid under high pressure, a valve between said passages, a housing for the valve, a spring cooperating with said valve and housing and biasing said valve to a closed position, restricted bleeder means for passing fluid very slowly between said passages while the valve is in closed position to build up fluid pressure slowly in the first mentioned passage, fluid pressure responsive means cooperating with said valve for movement of the valve to its open position directly in response to a substantially predetermined fluid pressure in the first mentioned passage, and a second valve for closing said passages and having a closed position reached by continued movement of the first valve from its closed position, said fluid pressure responsive means being adapted for also moving the second valve to its closed position.

7. The combination with a valve housing, of a valve therein, an inlet passage, an outlet passage, a partition between said passages, a valve seat formed on one side of said partition, a spring cooperating with said housing and valve and biasing said valve to its seat whereby any initial flow of high pressure gas is restricted directly in response to pressure in the outlet passage below a substantially predetermined value, a bleeder means between said inlet and outlet passages for slowly building up gas pressure in the outlet passage when the valve engages its seat to protect any gas pressure damageable device connected to said outlet passage against a high pressure gas surge, and means whereby the spring may be compressed and the valve moved away from its seat to increase the gas flow between said passages directly in response to the outlet passage having had a slow build up of gas pressure from the bleeder means to said substantially predetermined value.

8. The combination with a valve housing in at least two parts between which parts a diaphragm is clamped, said housing having a partition spaced from the diaphragm, an outlet passage leading from between said diaphragm and partition, an inlet passage leading to the side of said partition opposite the outlet passage, of a valve connected to said diaphragm and adapted to engage the outlet side of said partition as a seat, a bleeder passage between the inlet and outlet passages for passing fluid at a greatly reduced rate when the valve is seated to effect a slow build up of fluid pressure in the outlet passage, said partition being provided with a perforation across which the valve extends when seated, a spring cooperating with the diaphragm and housing for urging the valve to its seat, the area of the valve exposed to fluid inlet pressure being small so that the force of fluid inlet pressure on the valve is small compared to the force of the spring and fluid pressure on the diaphragm, whereby the seating and unseating of the valve is substantially directly responsive to fluid outlet pressure and substantially independent of fluid inlet pressure.

WORTHY C. BUCKNAM.